April 29, 1924.　　　　　　　　　　　　1,492,107
G. L. SAATHOFF
CORNSTALK AND HAND BINDER
Filed Jan. 10, 1923　　　2 Sheets-Sheet 1
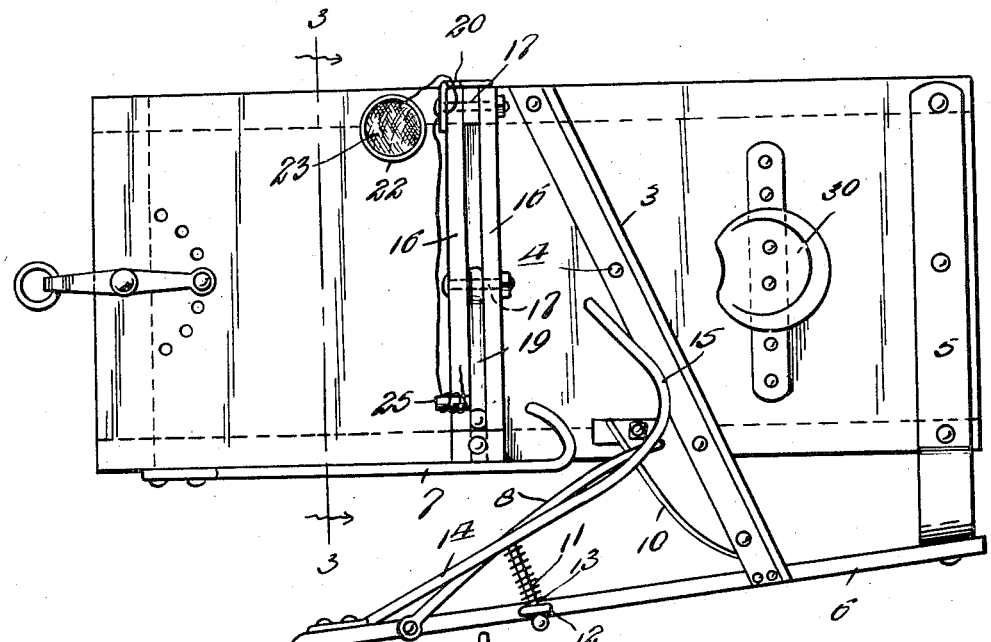
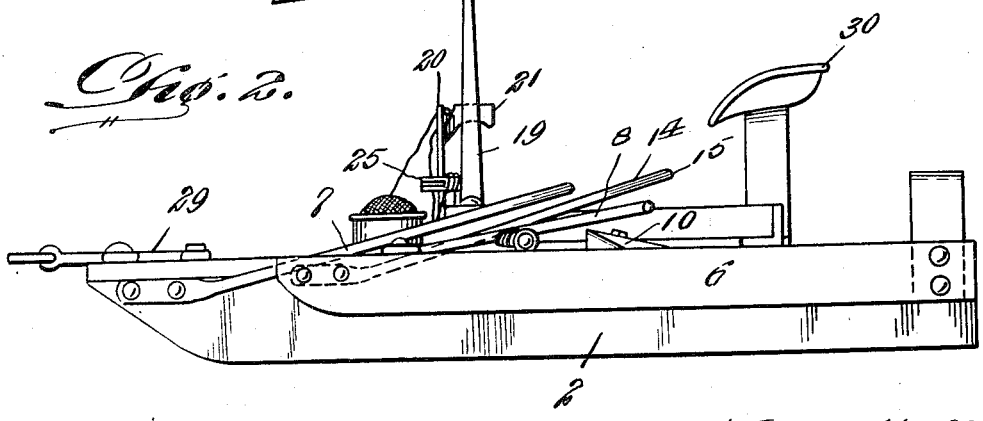

April 29, 1924.
G. L. SAATHOFF
CORNSTALK AND HAND BINDER
Filed Jan. 10, 1923    2 Sheets-Sheet 2
1,492,107
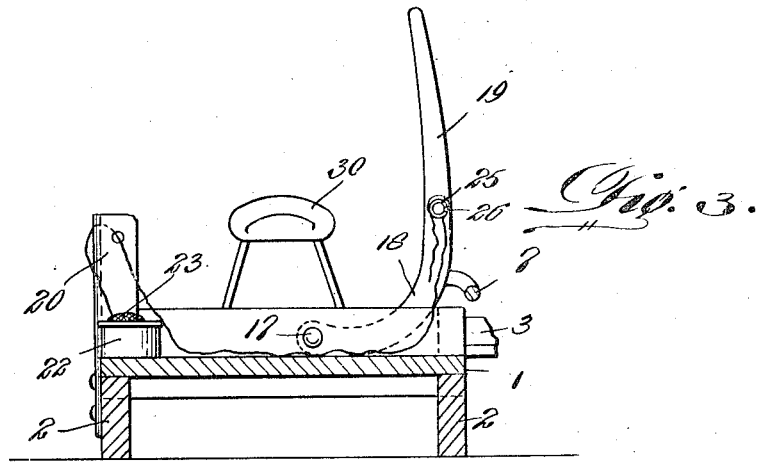
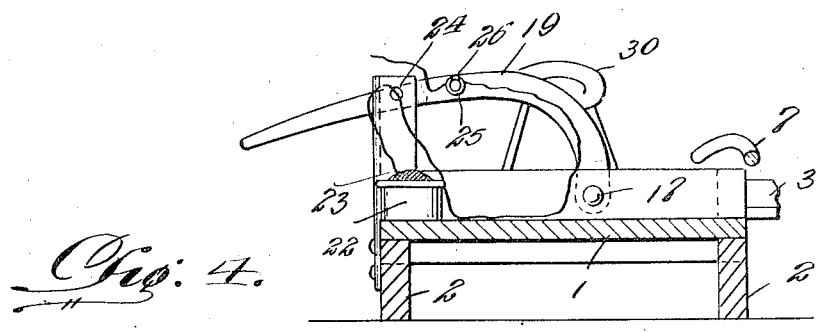
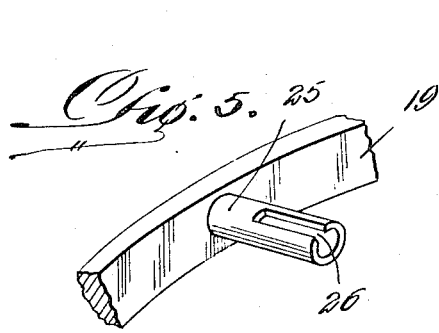
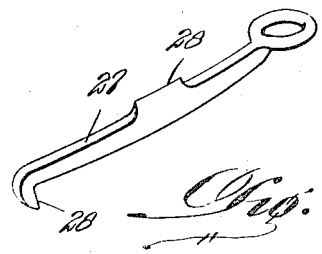

Patented Apr. 29, 1924.

1,492,107

UNITED STATES PATENT OFFICE.

GEORGE L. SAATHOFF, OF GRACEMONT, OKLAHOMA.

CORNSTALK AND HAND BINDER.

Application filed January 10, 1923. Serial No. 611,717.

*To all whom it may concern:*

Be it known that I, GEORGE L. SAATHOFF, a citizen of the United States, residing at Gracemont, in the county of Caddo and State of Oklahoma, have invented certain new and useful Improvements in Cornstalk and Hand Binders, of which the following is a specification.

The primary object of my said invention is the provision of a machine that may be successfully drawn between rows of corn stalks, for cutting these stalks and arranging the same in such a position upon the machine, so that the stalks may be expeditiously bound and in any size bunches.

A further object of my invention resides in the provision of such a machine that is comparatively simple of construction, inexpensive of manufacture and highly useful of purpose.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a top plan view of the machine constructed in accordance with the present invention.

Figure 2 is a side elevational view thereof.

Figure 3 is a transverse cross sectional view upon the line 3—3 of Figure 1, and looking rearwardly in the direction of the arrows, and also showing the stalk controlling lever in an upright position.

Figure 4 is a view similar to Figure 3, but with the said stalk control lever thrown downwardly.

Figure 5 is a fragmentary perspective view of a portion of the above mentioned stalk control lever, and Figure 6 is a perspective view of a hook member used in conjunction with the present invention.

With particular reference to the drawings my machine includes the provision of a substantially longitudinal frame 1, supported at its opposite sides by longitudinal runners 2, which assist in moving the machine over the ground.

Upon the top of this frame 1 is a cross bar 3 of angular formation, which bar may be secured to said frame by rivets or screws 4. Upon the rear end of the frame, there is similarly secured a cross bar or strip 5, and by a consideration of Figure 1, it will be seen that the first mentioned bar 3 is positioned upon the frame at an angle to the end bar or strip 5. One end of each of these bars projects outwardly of the side edge of the frame and is connected to a stalk guide arm 6, this arm converging outwardly from the frame 1 towards its front end as clearly shown in Figure 1.

Secured to the adjacent edge of the frame, and adjacent the front end thereof is a rearwardly extending guide rod 7, which cooperates with a rearwardly, and inwardly extending guide rod 8, which is pivoted as at 9 adjacent the front end of the guide arm 6 and upon the upper edge thereof. As before mentioned, the rods 7 and 8 cooperate with each other for guiding the corn for facilitating the easy cutting of the same by the knife 10.

A rod 14 is attached at its forward end to the forward portion of the guide arm 6 and at the inner side surface thereof. The said rod 14 is upwardly and rearwardly inclined and is provided at its rear end with a curved portion 15 which is disposed above the adjacent edge portion of the frame 1 and spaced from the hooked rear end of the rod 7. An eye 12 is mounted upon the upper edge of the guide arm 6 and a bolt 11 passes through the said eye and is connected at one end with the intermediate portion of the guide rod 8, which contacts at this point with the guide rod 14. A coiled spring 13 surrounds the bolt 11 and bears at one end against the side of the eye 12 and at its opposite end against the rod 8 and serves to resiliently brace the intermediate portion of the said rods 8 and 14.

Rigidly mounted upon the top face of the frame, and slightly forwardly of the angular bar 3 are a pair of transverse cross strips 16 maintained in spaced relation with each other by spacing blocks 17 at the opposite ends thereof. Pivoted substantially centrally between these strips 16, as at 17, is the lower curved end 18 of a lever 19. This lever normally extends vertically at the side of the frame adjacent the stalk guide arm 6.

In operation, my machine is moved over the ground and between rows of corn stalks, these stalks adapted to engage between the guide arm 6 and the adjacent edge of the frame 1. It will at once be apparent that the stalks will be bent inwardly towards the machine frame by the tension rod 8 and guide rod 14, this last mentioned rod also serving to bend the stalks forwardly and permitting the easy cutting of the same by the knife 10. After the stalks are cut, the same will fall in a longitudinal direction upon the frame and overlie the cross strips 16 and hooked end 18 of the lever 19. After a sufficient number of the stalks have been cut, the machine is stopped, and the lever 19 is swung over into a position as shown in Figure 4. Such a movement of this lever will serve to compress the stalks in a bunch, between the vertical portion of the lever and a vertical standard 20, provided upon the opposite side of the machine frame. This standard 20 is formed at its upper end with a rearwardly extending arm, beneath which the lever 19 is positioned for retaining the same in the position shown in Figure 4, at which time, the bunch of stalks may be securely tied together in a manner hereinafter described. At one side of the frame 1, and slightly forwardly of the vertical standard 20, there is positioned a container 22 for holding a ball of cord or twine 23. Previously to the stalk cutting operation, the end of the cord is drawn upwardly and inserted through an opening 24 in the upper end of the said standard 20. The cord is then extended across the frame and adjacent the transverse strips 16—16, at which time, it is again extended upwardly and coiled around a forwardly projecting tubular member 25 carried by the vertical lever 19, and substantially intermediate the ends thereof. As clearly shown in Figure 5, this tubular member 25 is in the form of a pipe, and is slotted for a portion of its length and upon its top side as at 26. When the lever 19 is thrown over as in Figure 4, the cord 23 encircles the bunch of stalks, and the free end thereof lies adjacent the opening 24 in the standard 20. The cord is again wrapped around the tube 25, and a combined knot tying tool and cord cutter 27 clearly illustrated in Figure 6, extended within the tube and the hooked end 28 thereof is projected through the slot 26. The innermost one of the convolutes of the coil of string around the tube is drawn outwardly thereof, and the string adjacent the opening is cut by the knife edge 28 on the tube. The two ends of the cord are then tied in a knot, and the operation is completed. The front end of the machine is provided with any desirable form of draft appliance 29 and at the rear end of the frame is an operator's seat 30.

In view of the above description, it is believed by me that the operation and advantages of the above described machine will be readily apparent to those skilled in the art, and even though I have herein shown and described the preferred embodiment of the invention, it is nevertheless to be understood that minor changes may be made therein, without departing from the spirit and scope of the invention as claimed.

What I claim as new is:—

A stalk cutter and binder comprising a frame, a stalk guide member mounted beyond the edge of the frame and disposed at an angle with relation thereto, a blade carried by the frame and disposed transversely across the space between the frame and the said guide, a rod mounted upon the edge of the frame and being upwardly and rearwardly inclined and provided at its rear end with a hooked portion disposed over the edge of the frame, a rod mounted upon the forward portion of the guide and disposed across the space between the guide and the frame and provided at its rear end with a curved portion which is disposed above the frame and spaced from the hooked portion of the first mentioned rod, a guide rod mounted upon the forward portion of the first mentioned guide and disposed below the second mentioned rod and being upwardly and rearwardly inclined with its rear end disposed above the blade, means mounted upon the frame for holding a length of twine disposed transversely across the frame, and a lever carrying the said length of twine and pivoted to swing transversely over the frame, said lever serving as means for drawing the twine around a bundle of stalks and disposing the end portion of the twine toward that side of the frame opposite the side thereof at which the said guide member and guide rods are located.

In testimony whereof I affix my signature.

GEORGE L. SAATHOFF.